United States Patent
Pernu

(10) Patent No.: US 7,889,756 B2
(45) Date of Patent: Feb. 15, 2011

(54) APPARATUS, METHODS AND COMPUTER PROGRAM PRODUCTS PROVIDING TEMPORARY LINK QUALITY MODIFICATION FOR MULTIRADIO CONTROL

(75) Inventor: Ville Pernu, Tampere (FI)

(73) Assignee: Nokia Corporation, Espoo (FI)

( * ) Notice: Subject to any disclaimer, the term of this patent is extended or adjusted under 35 U.S.C. 154(b) by 917 days.

(21) Appl. No.: 11/648,100

(22) Filed: Dec. 29, 2006

(65) Prior Publication Data

US 2008/0159327 A1 Jul. 3, 2008

(51) Int. Cl.
*H04B 7/212* (2006.01)
(52) U.S. Cl. .................... 370/444; 370/337; 370/347
(58) Field of Classification Search ............... 370/444, 370/337, 347
See application file for complete search history.

(56) References Cited

U.S. PATENT DOCUMENTS

| | | | | |
|---|---|---|---|---|
| 7,058,040 | B2 * | 6/2006 | Schmidt | 370/337 |
| 7,065,367 | B2 * | 6/2006 | Michaelis et al. | 455/452.2 |
| 7,187,923 | B2 * | 3/2007 | Mousseau et al. | 455/416 |
| 7,190,679 | B2 * | 3/2007 | Khawand et al. | 370/278 |
| 7,373,172 | B2 * | 5/2008 | Godfrey | 455/552.1 |
| 2003/0058830 | A1 | 3/2003 | Schmidt | 370/347 |
| 2003/0083095 | A1 * | 5/2003 | Liang | 455/552 |
| 2004/0242159 | A1 | 12/2004 | Calderon et al. | 455/63.3 |
| 2005/0215284 | A1 | 9/2005 | Su et al. | 455/556.2 |
| 2006/0068837 | A1 | 3/2006 | Malone | 455/552.1 |
| 2006/0205401 | A1 | 9/2006 | Palin et al. | 455/425 |
| 2006/0292986 | A1 * | 12/2006 | Bitran et al. | 455/41.2 |
| 2008/0101446 | A1 * | 5/2008 | Gautier et al. | 375/222 |

FOREIGN PATENT DOCUMENTS

| | | |
|---|---|---|
| EP | 1119137 A1 | 7/2001 |
| EP | 1708420 A1 | 10/2006 |
| WO | WO 2004/045092 A1 | 5/2004 |

OTHER PUBLICATIONS

Marina, Mahesh K., et al., "A Topology Control Approach for Utilizing Multiple Channels in Multi-Radio Wireless Mesh Networks", Proc. Broadnets 2005 Symposium, Boston, MA, Oct. 2005, 10 pgs.

* cited by examiner

*Primary Examiner*—Ricky Ngo
*Assistant Examiner*—Ben H Liu
(74) *Attorney, Agent, or Firm*—Harrington & Smith

(57) ABSTRACT

Disclosed herein are apparatus, methods and computer program products for reallocating on a temporary basis at least a portion of access to a common communications channel ordinarily allocated to a high priority modem of a multi-modem terminal to a lower priority modem of the multi-modem terminal. A first method allocates access to a high priority modem in dependence on a traffic pattern exhibited by the high priority modem. During temporary periods, at least a portion of access ordinarily allocated to the high priority modem is made available to a lower priority modem. In a second method, access to the common communications channel is allocated according to a pattern masking procedure. In the pattern masking procedure, time slots sought by a lower priority modem are masked by time slots sought by a higher priority modem. During a temporary period when it is sought to favor a lower priority modem, the order of the masking procedure is altered. During the temporary period, the time slots sought by the ordinarily lower priority modem mask the time slots sought by the higher priority modem. Whenever there is overlap, the lower priority modem will pre-empt the higher priority modem.

21 Claims, 13 Drawing Sheets

| | |
|---|---|
| INITIAL TICK  34 | 32 BITS |
| TABLE SIZE  36 | 32 BITS |
| IS CYCLING  38 | 1 BIT |
| SLOT/TRAFFIC ELEMENT BORDER  40a | 1 BIT |
| ... | |
| SLOT/TRAFFIC ELEMENT BORDER  40x | 1 BIT |

| | | | |
|---|---|---|---|
| INITIAL TICK  44 | | | 32 BITS |
| TABLE SIZE  46 | | | 32 BITS |
| IS CYCLING  48 | | | 1 BIT |
| Tx ALLOWED/BLOCKED  50a | | Rx ALLOWED/BLOCKED  52a | 2 BITS |
| ... | | | |
| Tx ALLOWED/BLOCKED  50y | | Rx ALLOWED/BLOCKED  52y | 2 BITS |

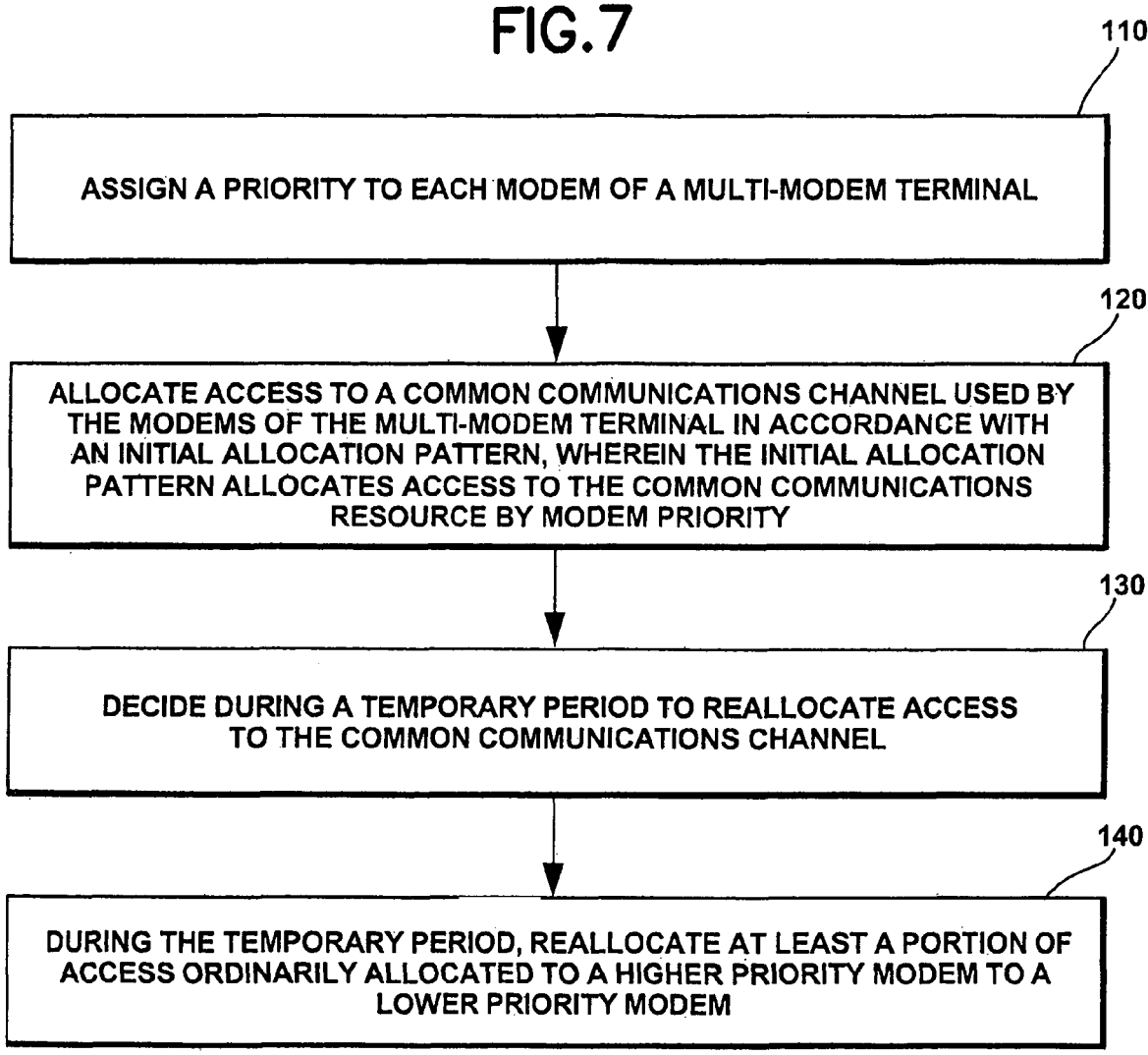

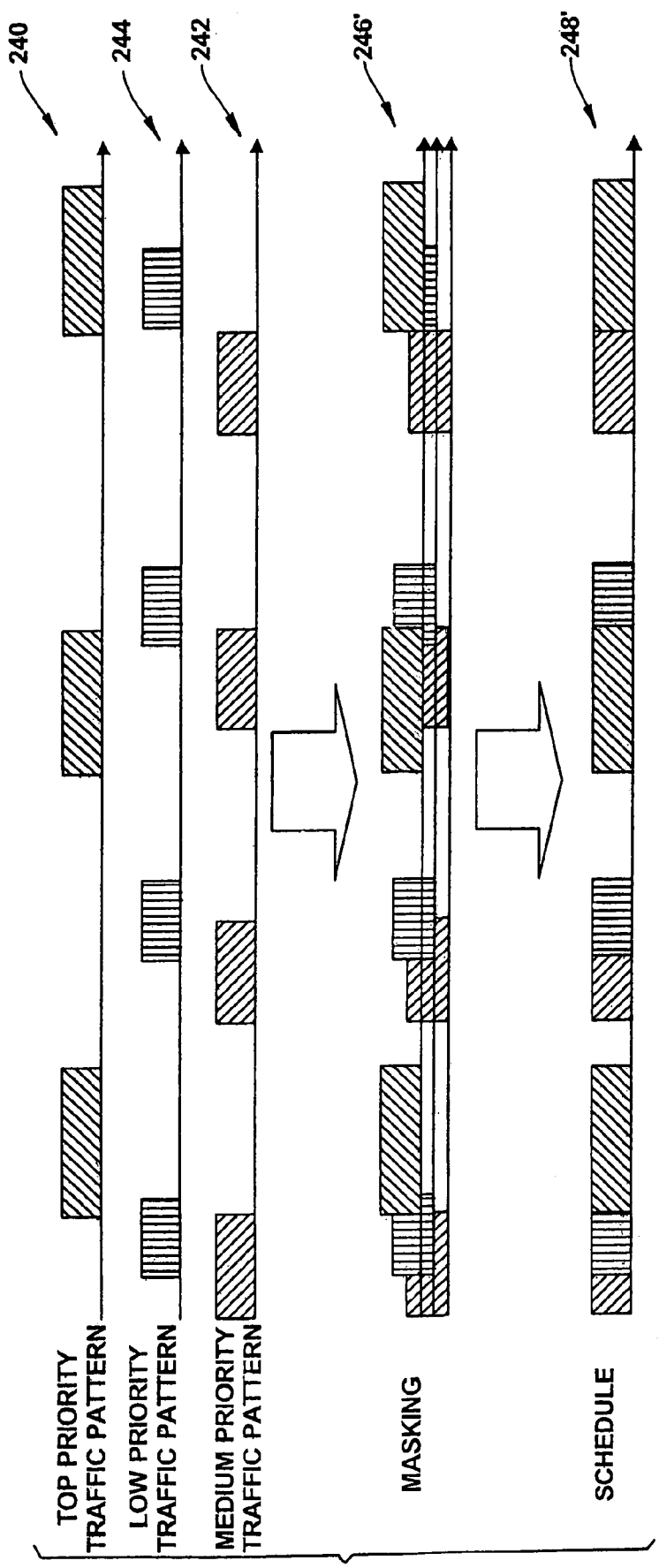

APPARATUS, METHODS AND COMPUTER PROGRAM PRODUCTS PROVIDING TEMPORARY LINK QUALITY MODIFICATION FOR MULTIRADIO CONTROL

CROSS REFERENCE TO RELATED APPLICATIONS

This application is related to two U.S. Patent Applications filed this same day: U.S. patent application Ser. No. 11/647,620 entitled "Multiradio Synchronization and Scheduling Control"; and U.S. patent application Ser. No. 11/647,615 entitled "Apparatus, Methods and Computer Program Products Providing Pattern Masking and Traffic Rule Matrix Scheduling for Multiradio Control". The disclosure of these two related applications is hereby incorporated by reference as if fully restated herein.

TECHNICAL FIELD

The exemplary and non-limiting embodiments of this invention generally concern a multi-radio controller for use in a terminal having multiple radios seeking to transmit in a common communications channel and more particularly concerns apparatus and methods for reallocating on a temporary basis at least a portion of access to the common communications channel ordinarily allocated to high priority radios to low priority radios.

BACKGROUND

Various distinct networks exist over which a wireless device can communicate, such as a mobile telephony network (e.g., CDMA, GSM, etc.), a wireless local area network WLAN or WiFi network, a piconet (e.g., Bluetooth). Wireless devices that communicate over multiple such networks are termed herein as multiradio devices, indicative of the multiple radios that such a device incorporates so as to enable communication over multiple networks. For example, a WLAN access point may have a radio for communication with WLAN terminals; a Bluetooth radio to couple with a printer; and a wired or wireless (e.g., Bluetooth, infrared, another WLAN) connection to the Internet. Similarly, a mobile terminal/mobile station may have one GSM modem, a CDMA modem, a Bluetooth modem (e.g., with a headset), and a DVB-H modem. Any individual multiradio device may also have more than one radio for communicating over a single network, such as a mobile station having two GSM radios so as to avoid switching between an active Node B and another Node B in preparation for a handover. Each of these radios has a modem, and "modem" and "radio" will be used interchangeably hereinafter.

More particularly for the modems operating under control of different networks, there is a potential for modems to interfere with one another when transmitting or receiving simultaneously with other modems where the disparate networks use frequency ranges that overlap and each network schedules/authorizes the multiradio device to transmit/receive at an overlapping frequency at the same time. The result is wasted bandwidth due to data collisions from different modems of the same wireless device.

One fundamental difficulty in designing a multiradio device to avoid self-collision among its modems is the ability to interpret any modem's behavior regardless of the clock-domain it uses. Not only do the modems typically have their own hardware clocks with different frequencies as compared to other modems of the same device, but they are also synchronized with their corresponding peer devices (e.g., WLAN with access point, GSM with base station, Bluetooth with an ad hoc peer). As the mobile device is moved around, its modems' synchronization with the respective peer shifts and changes, thus offsetting their transmission instances. The result is that any difference between transmission grant start times on different networks is not constant. The term slot is used herein generically to represent an authorized transmission or reception window. While the term slot is specific to some radio protocols, its use herein does not imply limitation to only those radio protocols that use the term explicitly.

Another difficulty is the nondeterministic nature of delays caused by bus arbitration within the multiradio device. If all the timing-critical functions designed for multiradio control were to be placed in a central processor, the signaling between modems and that central processor becomes the volatile factor that may handicap the entire design concept. At best it makes a software design difficult and reduces its portability among different types of multiradio devices that operate on the same sets of networks, since the different types of multiradios would exhibit different bus arbitration. At worst it generates a substantial load on that central processor due to timer checks and resynchronization calculations caused by inaccurate time information.

Other issues are raised by operation of such multiradio devices. Since it is often impossible to allow more than one radio or modem of the multiradio device to access a common communications resource (such as, for example, a common communications channel) at the same time, access to the common communications resource has to be allocated in some manner. In one conceivable allocation scheme, access to the common communications resource may be allocated in a pre-determined manner, with one modem being allocated a certain percentage of non-concurrent access; another modem being allocated a different percentage of non-concurrent access, etc.

Such an approach, though, may not accommodate transient needs of one of the modems for a higher percentage of access due to, for example, criticality of information being communicated. Although allocation by percentage may be desirable for most situations, it would also be desirable to deviate from this allocation scheme for a temporary period of time. Accordingly, those skilled in the art seek methods and apparatus that are capable of providing such modes of operation.

SUMMARY OF THE INVENTION

The foregoing and other problems are overcome, and other advantages are realized, in accordance with the presently described embodiments of these teachings.

A first embodiment of the invention is a method comprising: assigning a priority to each modem of a multi-modem terminal; allocating access to a common communications channel used by the modems of the multi-modem terminal in accordance with an initial allocation pattern, wherein the initial allocation pattern allocates access to the common communications channel by modem priority; deciding during a temporary period to reallocate access to the common communications channel; and during the temporary period, reallocating at least a portion of access ordinarily allocated to a higher priority modem to a lower priority modem.

A second embodiment of the invention is an apparatus comprising: a plurality of modems, the plurality of modems configured to transmit and receive signals in a common communications channel; and a modem access control unit coupled to each of the plurality of modems, the modem access control unit configured to assign a priority to each modem; to allocate access to a common communications channel used by the modems in accordance with an initial allocation pattern, wherein the initial allocation pattern allocates access to the common communications channel by modem priority; to decide during a temporary period to reallocate access to the common communications channel; and during the temporary period, to reallocate at least a portion of access ordinarily allocated to a higher priority modem to a lower priority modem.

A third embodiment of the invention is a computer program product comprising a computer readable memory medium tangibly embodying a computer readable program, the computer readable program executable by data processing apparatus, the computer readable program, when executed, configured to assign a priority to each modem of a multi-modem terminal; to allocate access to a common communications channel used by the modems of the multi-modem terminal in accordance with an initial allocation pattern, wherein the initial allocation pattern allocates access to the common communications channel by modem priority; to decide during a temporary period to reallocate access to the common communications channel; and during the temporary period, to reallocate at least a portion of access ordinarily allocated to a higher priority modem to a lower priority modem.

Further details as to various embodiments and implementations are detailed below.

BRIEF DESCRIPTION OF THE DRAWINGS

The foregoing and other aspects of these teachings are made more evident in the following Detailed Description, when read in conjunction with the attached Drawing Figures, wherein:

FIG. 2 illustrates an exemplary format for a synchronization table that may be generated for one of the modems in FIG. 1, according to an exemplary embodiment of the invention;

FIG. 4 illustrates an exemplary format for a scheduling table that may be generated for one of the modems in FIG. 1, according to an exemplary embodiment of the invention;

FIG. 7 is a flowchart depicting a method operating in accordance with an embodiment of the invention;

FIGS. 11-12 are charts graphically depicting the operation of the method depicted in FIG. 10.

DETAILED DESCRIPTION

In view of the bus arbitration and network timing variability discussed above, the inventors have determined that it is advantageous to map the different modems to a common reference time. Without this mapping any cross-modem comparison is meaningless, since a time value for one modem can mean something totally different to any other modem. Two terms are introduced: a Multiradio Controller MRC, and a Synchronization and Scheduling Controller SSC. The MRC may be a processor, such as a central processing unit, that controls the radios/modems in the device. Functionally, the MRC manages the interoperability issues between modems on a radio front-end level. The SSC may be an application specific integrated circuit ASIC, an application specific instruction set processor ASIP, or specific functionality built into the MRC, or even software only executable by the MRC. For ready implementation without having to re-design existing MRCs, advantageous embodiments include an ASIC/ASIP though the invention is not limited only to that embodiment. The MRC and SSC are described separately herein for clarity of description, though it should be recognized that the differing functionality may be embodied within a single processor.

Functionally, the SSC provides the MRC with the capacity to communicate with any radio on a timing-accurate level. According to specific embodiments detailed below, the SSC: 1) synchronizes the MRC with all modems and places their behavior into a common reference time domain; and 2) sets traffic schedules to modems according the instructions given by the MRC. As will be seen, certain advantages of embodiments of the invention include:

Reduced terminal power consumption. Because the SSC is in some embodiments a separate calculation element from the master control unit MCU (which processes the MRC core functions), it allows the MCU to be put to a power-save mode more often, since all frequent time-critical functions are executed in the SSC.

Removes the need for tight time-critical control in the MCU, drastically simplifying the design of software for the MRC.

Removes the need for time-aware bus arbitration between modems and the MRC.

Allows the efficient control of all modem traffic with minimum changes to the modems themselves (e.g., the modems need not store long vectors of scheduling information, since the control signals detailed below from the SSC have deterministic and minimal delay times.

Stability over time. Because of the deterministic nature of the control signal delays between modems and SSC, the synchronization table detailed below is very reliable and is expected to last a fairly long time without the need for resynchronization.

Figure 1:
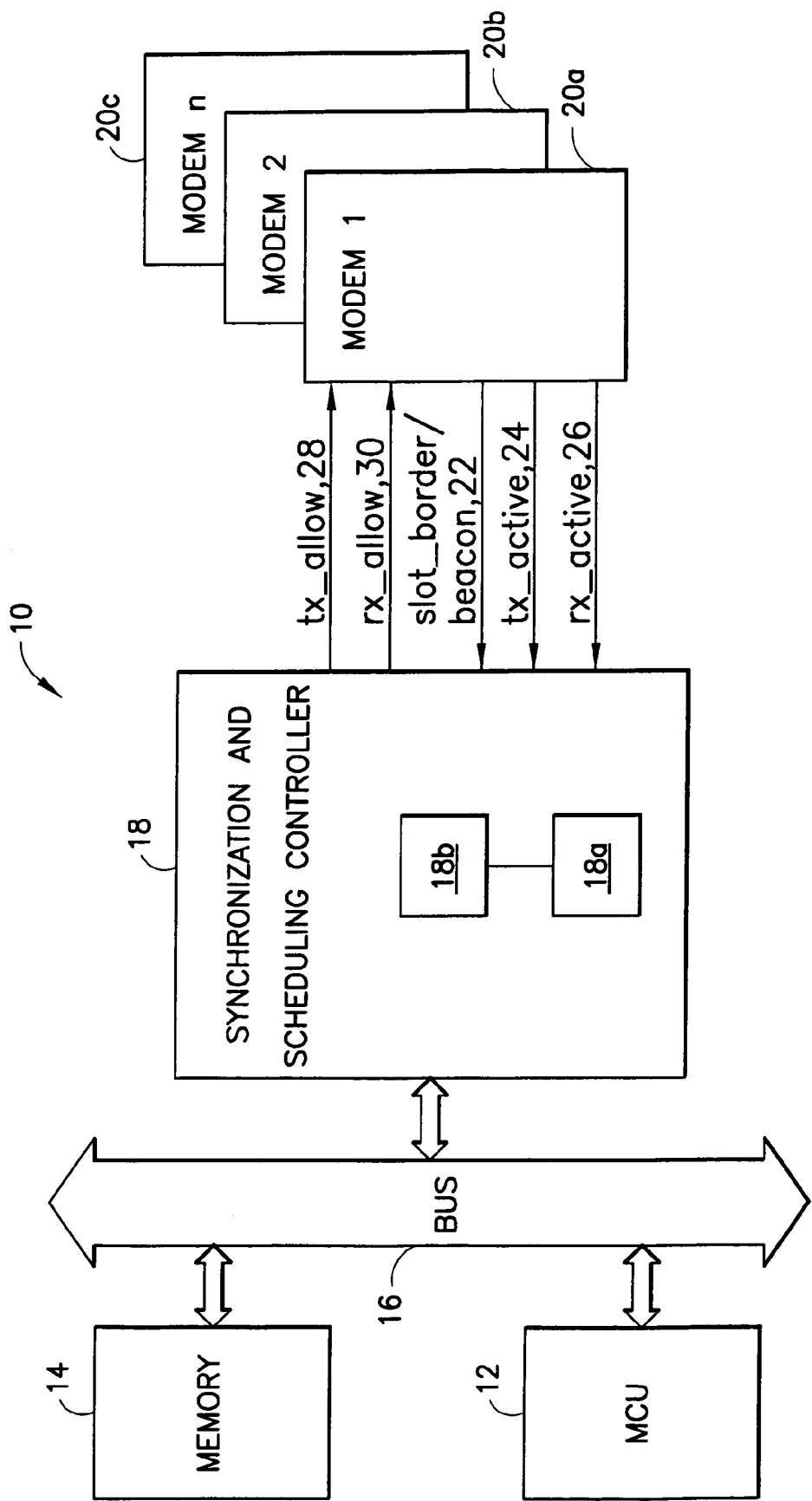
FIG. 1 shows a simplified block diagram of components of a device in accordance with an exemplary embodiment of the invention.

FIG. 1 illustrates a simplified block diagram of a multiradio device 10 incorporating the SSC functions within an ASIC/ASIP. Specifically, a MCU 12 is coupled to a memory 14 through a bus 16. Alternatively, the memory 14 may be a part of the MCU 12 such as a random access memory RAM. The SSC 18 is shown as an ASIC/ASIP disposed between the MCU 12 and various modems 20a, 20b, 20c. There may be two or more modems, indexed by n=1, 2, . . . N. Various signals between the modems 20a, 20b, 20c and the SSC 18 are representative of signals between the SSC and an individual modem. Each modem 20a, 20b, 20c signals to the SSC 18 its slot border by a slot border beacon 22. The slot border is determined by the particular network over which that modem communicates. As noted above, some modem protocols do not use a regular traffic unit such as slots. For these protocols the slot border is replaced with the smallest network element, which in the case of WLAN is the beacon signal.

Each modem 20a, 20b, 20c further signals to the SSC 18 specific instances in which it is authorized to transmit or receive by whatever transmission protocol is used by that modem's network. (FIG. 3B describes an instance where only one tx or rx signal is necessary to resolve multiple transmit/receive authorizations.) These signals are indicated as a transmit (tx) active signal 24 and a receive (rx) active signal 26. The SSC 18 uses the slot border beacons 22 to map each modem to a common reference time, builds a schedule of transmission and reception active times/slots for each modem, and determines where instances of potential interference might occur. For example, assume modems 20a and 20b use overlapping frequencies but modem 20c does not. The SSC 18 need not inhibit transmissions or receptions for an active transmission or reception slot that overlaps as between modems 20a and 20c (or 20b and 20c), but need be concerned only with such active slot overlaps as between modems 20a and 20b since only there is a potential for self-interference among modems of the same device 10. The SSC can perform its comparison of modem schedules, regardless of the different clocks used by each modem 20a, 20b, 20c, because those schedules are mapped in the SSC 18 to a common clock, termed herein a master clock. A convenient common clock might be the system clock for the device 10, such as that referenced by the MCU 12. Other embodiments may find the SSC 18 using one of the modem clocks as a master clock, to which the other schedules from other modems are justified.

Using the various schedules mapped to a master clock, the SSC 18 then sends to each modem a transmission allow signal 28 and a reception allow signal 30, indicating for each slot, or for each authorized active slot as reported in signals 24, 26, whether or not that particular modem is inhibited or not inhibited from transmitting/receiving during that slot. This allow/inhibit signal 28, 30 is over and above any authorization given the modem by the network, so that where two modems that may potentially interfere are both authorized to be active for a time slot that overlaps with the other, one of them will be inhibited by the transmit allow/inhibit signal 28 and/or the receive allow/inhibit signal 30. While the invention is detailed with respect to allow/inhibit signals 28, 30 from the SSC 18 to one of two modems 20a, 20b, 20c that potentially overlap, it is understood that for the case of three or more overlapping active slots for potentially interfering modems, the SSC 18 sill send inhibit signals to all but one of those modems 20a, 20b, 20c.

In an embodiment, the SSC 18 maps the slot border beacons 22 from the various modems 20a, 20b, 20c to a master clock by means of a synchronization table 32, the format of which is shown in FIG. 2. While this is described as one synchronization table for one modem, it is understood that a synchronization table is generated for each modem, and the same information may be combined into a unified table and stored as such. For simplicity a single table per modem is detailed. It is advantageous that the SSC 18 write the synchronization table(s) to the memory 14 for ready access by the MCU 12, which is in fact in overall control of the modems 20a, 20b, 20c. Direct control by the SSC 18 over the modems is limited to the allow/inhibit signals 28, 30; other control signals originating at the MCU 12 may be merely passed through the SSC 18 unchanged, or alternatively modified as necessary to reflect the described allow/inhibit signals 28, 30 but otherwise passed through if not modified. Direct allow/inhibit signals 28, 30 are seen as simpler in that the other control signals from the MCU 12 are generally not time-critical to the clocks of the modems, unlike the allow/enable signals 28, 30.

The synchronization table 32 of FIG. 2 shows four distinct fields: an initial tick field 34, a table size field 36, a cycling field 38, and a plurality of slot/traffic border element fields 40a through 40x. The initial tick field 34 field tells the absolute time value, at which this table 32 becomes valid. The table size field 36 indicates how many traffic element border fields (40a to 40x) there are in this table 32. The cycling field 38 indicates whether the table 32 is valid after the time instant given by adding the initial tick field 34 to the number of slot/traffic element border fields 40a to 40x (initial tick+table size). That is, if the table cycle field 38 indicates cycling, the synchronization table 32 is re-used. If the table 32 is cycling, it can be used indefinitely. Each slot/traffic element border field 40a to 40x indicates whether there is a slot border timed (in the modem 20a, 20b, 20c to which this synchronization table 32 applies) at the tick instant given by the position of that slot/traffic element 40a, . . . 40x (e.g., at time initial tick+element index).

Figure 3A:
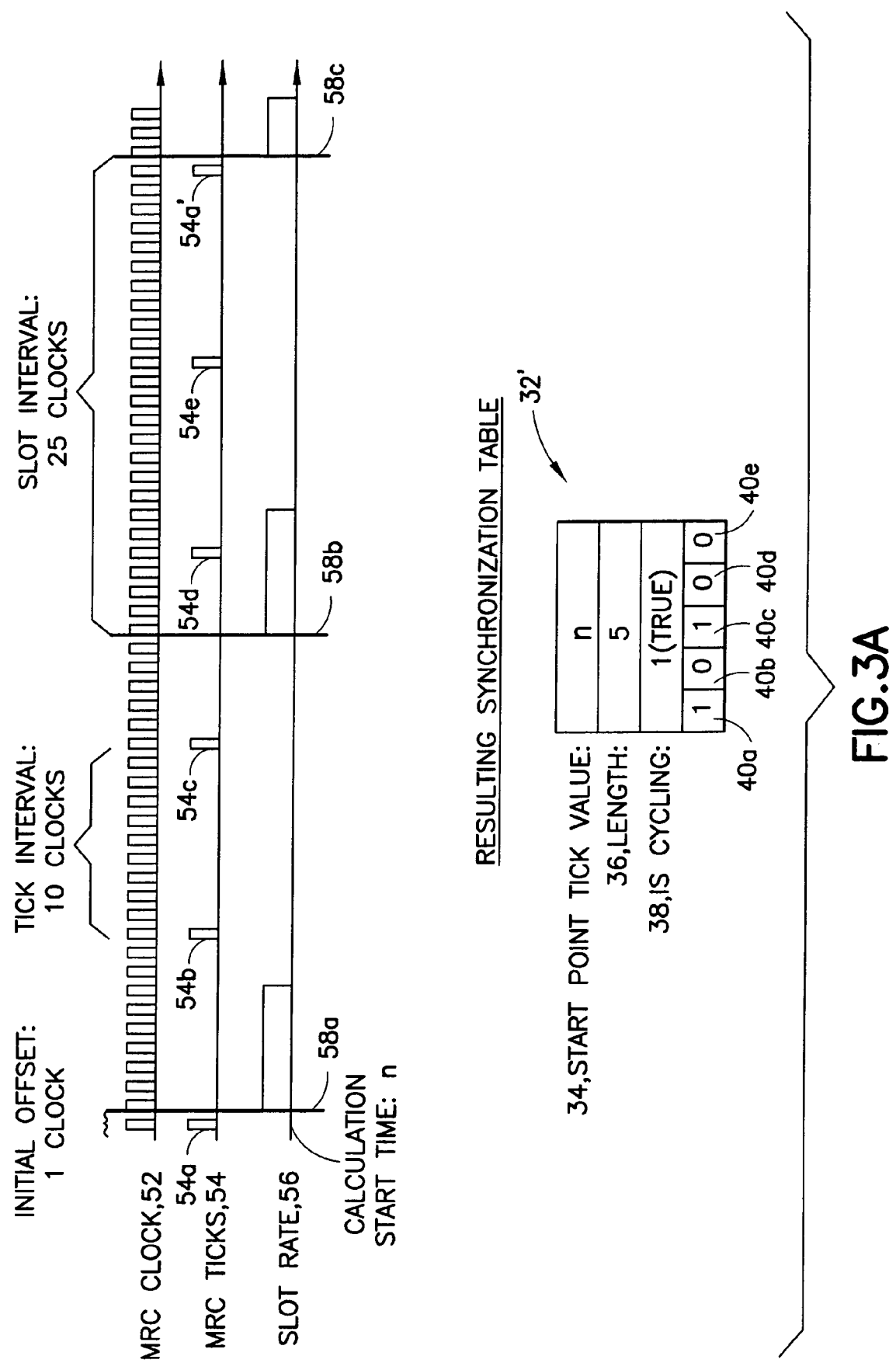
FIG. 3A illustrates a timing diagram and a resulting synchronization table following the format shown in FIG. 2 for one modem according to an exemplary embodiment of the invention for one type of network scheduling architecture.

FIG. 3A is an example of how the fields in a synchronization table 32 may be computed by the SSC 18. The timing diagram at the top of the FIG. 3A shows an MRC clock 52 and MRC ticks 54 spaced at intervals of ten clock cycles. A convenient interval for the MRC ticks 54 may be chosen based on the slot intervals of the various networks accessed by the multiradio device 10, or an arbitrary integer may be used with some minimal increase in SSC calculation. The slot border beacon 22 from one of the modems indicates to the SSC where the slot boundaries are located for that modem's network, which in the timing diagram at the top of FIG. 4 are plotted as 58a, 58b and 58c. If the slot border beacon 22 is not present in a system described herein, the same information may be extrapolated from the activity signals. In that case, the slot border measurement requires modem traffic. Note that the modem reporting its slot boundary beacon is not reporting with reference to the MRC clock 52 or its ticks 54; the SSC 18 maps those boundaries 58a, 58b, 58c to the chosen master clock as shown in that timing diagram. Consider the start time for the synchronization table 32' being generated as indicated in the timing diagram, the first illustrated MRC clock tick 54a. Between the first tick 54a and the second 54b is a slot boundary 58a, so the slot/traffic border element field 40a corresponding to that first tick 54a is set with bit-on in the synchronization table 32'. Between the second tick 54b and the third tick 54c are no slot boundaries, so the slot/traffic border element 490b corresponding to that second tick 54b is bit-off. A second boundary 58b lies between the third 54c and fourth 54d ticks, so the corresponding slot/traffic border element 40c is bit-on. No boundaries lie between the fourth 54d and fifth 54c ticks, nor between the fifth tick 54e and the next subsequent tick 54a', so those respective corresponding slot/traffic border fields 40d, 40e are set bit-off. Since in this instance the tick interval was set at ten cycles of the MRC clock 52, which is convenient for this network's slot interval of 25 cycles of the MRC clock 52 (recognizing that the network is not timed to the MRC clock 52), the synchronization table 32' can repeat, so its cycling field 38 is set bit-on to indicate cycling. The cycle repeats after five MRC ticks 54, because five MRC ticks 54 correspond exactly to two full slot intervals of the network. Therefore, there are five slot/traffic border elements 40a to 40e, and the next subsequent MRC tick 54a' corresponds to the first slot/traffic border field 40a. The synchronization table 32' is generated and re-used cyclically until a change is received from the network. Such a change will typically arise not from a different slot interval, but from changing peers/controlling entities in the network so that the boundary under the new peer/entity is not exactly aligned with that of the former peer/entity. A slip of one MRC cycle 52 would cause a new table to be generated with different entries in the slot/traffic boundary fields 40a-40e, though the table length 36 and cycling 38 fields may be regenerated with the same values as before. The slot rate 56 here represents the maximum granularity of the selected radio network's physical data elements. If a traffic element cannot be segmented anymore in a modem, it can be labeled as a 'slot'. MRC tick rate 54 is selected so that for any modem in the Multiradio device the tick interval is smaller than slot interval.

As will be appreciated, the synchronization table 32' maps a set of timeslots (indicated by the boundaries 58a, 58b, 58c) for one of the modems 20a, 20b, 20c to a selected master clock, in this case the ticks 54a to 54e of the MRC 12. FIG. 3A shows that the MRC 12 knows, by reading the synchronization table written by the SSC 18 to the memory 14, exactly when a slot border happens in a modem. By logging specific and deterministic delays between the slot border 58a, 58b, 58c and a related MRC tick 54a-54e to a register, the precise instant of the border slot time is known to the individual MRC clock cycle 52. In refined embodiments, then overlapping periods of authorized transmit/receive activity can be plotted against one another rather than the less precise authorized slot intervals in order to determine whether an overlap occurs.

Now consider the scheduling table 42, of which an exemplary format is shown in FIG. 4. Certain fields are similar to those in the synchronization table 32 of FIG. 2. Specifically, the scheduling table 42 consists of an initial tick field 44, table size field 46, cycling field 48, and a number of tx allowed/blocked 50a to 50y and rx allowed/blocked 502a to 52y field pairs that equals the value in table size field. These field pairs originate the tx allow/inhibit signal 28 and the rx allow/inhibit signals 30 described with reference to FIG. 1. The initial tick field 44 tells the absolute time value at which this scheduling table 42 becomes valid. The table size field 46 indicates how many traffic element border field pairs 50a/52a to 50y/52y there are in this table. The cycling field 48 indicates whether the table is valid after the time instant initial tick+table size has passed. If the table is cycling, it can be used indefinitely. Unlike the synchronization table 32, if the scheduling table 42 is not cycling, the last table value pair 50y/52y remains as the modem's scheduling state until a new schedule is set. For example, if a scheduling table 42 is non-cycling and the last value pair is rx allowed, tx blocked, the modem to which this scheduling table applies is not allowed to transmit at all until a new schedule is generated. The tx allowed field (50a to 50y) indicates whether the MRC 12 allows this modem to transmit at the slot corresponding to the position of that tx allowed field (50a to 50y). The rx allowed field (52a to 52y) indicates whether the MRC 12 allows that modem to receive during the slot corresponding to that field's position.

Figure 5:
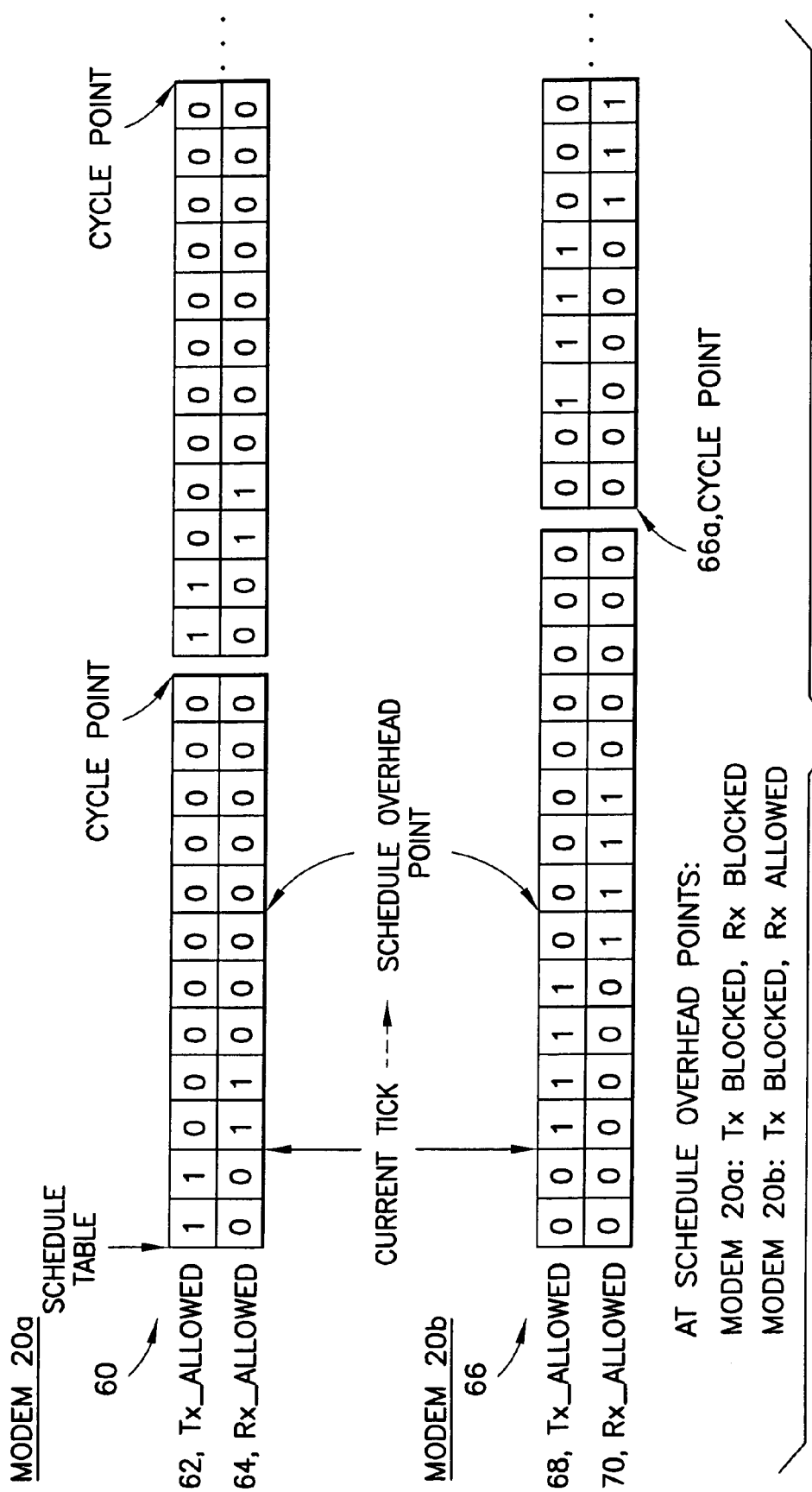
FIG. 5 illustrates two scheduling tables following the format of FIG. 4 for two of the modems of FIG. 1 according to an exemplary embodiment of the invention.

At FIG. 5 is shown the tx allow/inhibit signals 28 and the rx allow/inhibit signals 30 described with reference to FIG. 1 as drawn from two distinct scheduling tables 42. In this example the scheduling tables 42 for a first modem 20a and a second modem 20b each repeat. A first modem 20a has one cycling schedule, which as shown repeats every twelve MRC ticks. There are then twelve field pairs in its corresponding scheduling table 42. The illustrated bit sequence 60 for the first modem have pairs of tx and rx signals from the SSC 18, and represent those signals as sent seriatim to the first modem 20a. The bits in the tx allowed row 62 represent the tx allow/inhibit signals 28 from FIG. 1, with bit-on (1) indicating that transmission is allowed from that modem during the slot corresponding to that bit position, and bit-off (0) indicating inhibit transmission for that first modem during the corresponding slot. Similarly for the rx allowed row 64, which represents the rx allow/inhibit signals 30 of FIG. 1 for receive functions of the first modem 20a. It is seen that the bit sequences repeat after each cycle point 60a for the first modem 20a.

The illustrated bit sequence 60 for the second modem 20b of the same device 10 has another cycling schedule, which is seen to repeat each fifteen MRC ticks meaning that there are fifteen tx/rx pairs in its underlying scheduling table 42. Both bit sequences 60, 66 have a schedule overhead value, which they use to compensate the latencies in the system during traffic scheduling and thereby eliminate the bus arbitration problem. At the schedule overhead point 60b of the first modem 20a, it is seen that transmission and reception is inhibited for the first modem 20a, transmission is inhibited for the second modem 20b and reception is allowed for the second modem 20b. The same allow/inhibit signals are set for the scheduled overhead point 66b of the second modem 20b. The bit sequences 60, 66 are aligned in time vertically according to MRC ticks. It can be seen that with two exceptions there is no bit-on set for the same MRC tick for two rows 62, 64, 68, 70. Such is a simple embodiment: no two authorized/network scheduled slots are enabled at the same time, at least for potentially interfering modems. For that simple case, in all instances where a transmission or reception is allowed, all other instances of transmission and reception are inhibited by a bit-off in the tx or rx allowed signal. A reverse bit convention may also be used.

In some embodiments it may not be necessary to inhibit both transmission and reception of one modem in response to allowing an authorized transmission and/or reception on another modem; the invention may restrict only those instances of reception and/or transmission that would interfere with another modem's transmission and/or reception if allowed. This is illustrated at the first two ticks following the "current tick" notation in FIG. 5, and is particularly pertinent when one or both networks associated with the otherwise overlapping modems use different frequency bands for transmit and receive functions. In each of those two ticks, the first modem 20a is enabled to receive and the second modem 20b is enabled to transmit. In this instance, reception on the first modem 20a is not potentially interfering with transmission from the second modem 20b, such as due to a frequency separation between those different bands. Only overlap of two active instances that are potentially interfering need be restricted; else authorized transmit and receive slots go unused for no true gain. Further to frequency interference, the allow/inhibit signals 28, 30 may also be used to inhibit conflicting use of hardware in the device, such as where two modems share an antenna that is not configured for simultaneous operation over two different frequencies that the two sharing modems may use. Each of these variations is more specific to device hardware and the variances as between different networks. The more broad-based embodiments, not specific to a device or the networks on which its modems operate, are those that inhibit all transmit/receive activity whenever there is an overlapping authorized timeslot among different modems, except for either transmit or receive activity for one of the modems.

Figure 6A:
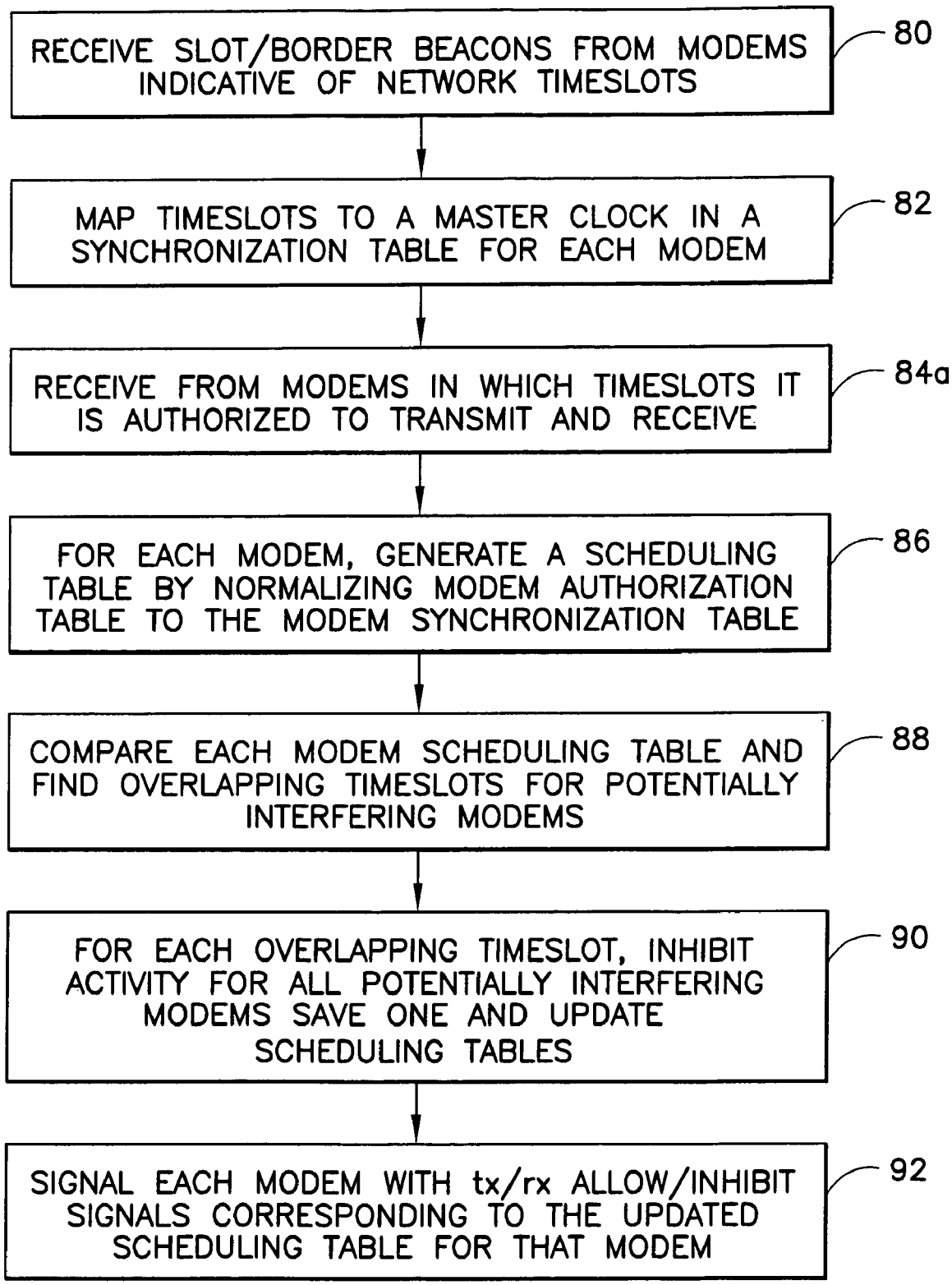
FIG. 6A illustrates process steps for synchronizing and scheduling modems of a multiradio device according to an exemplary embodiment of the invention for a network architecture consistent with the timing diagram of FIG. 3A.
Figure 6B:
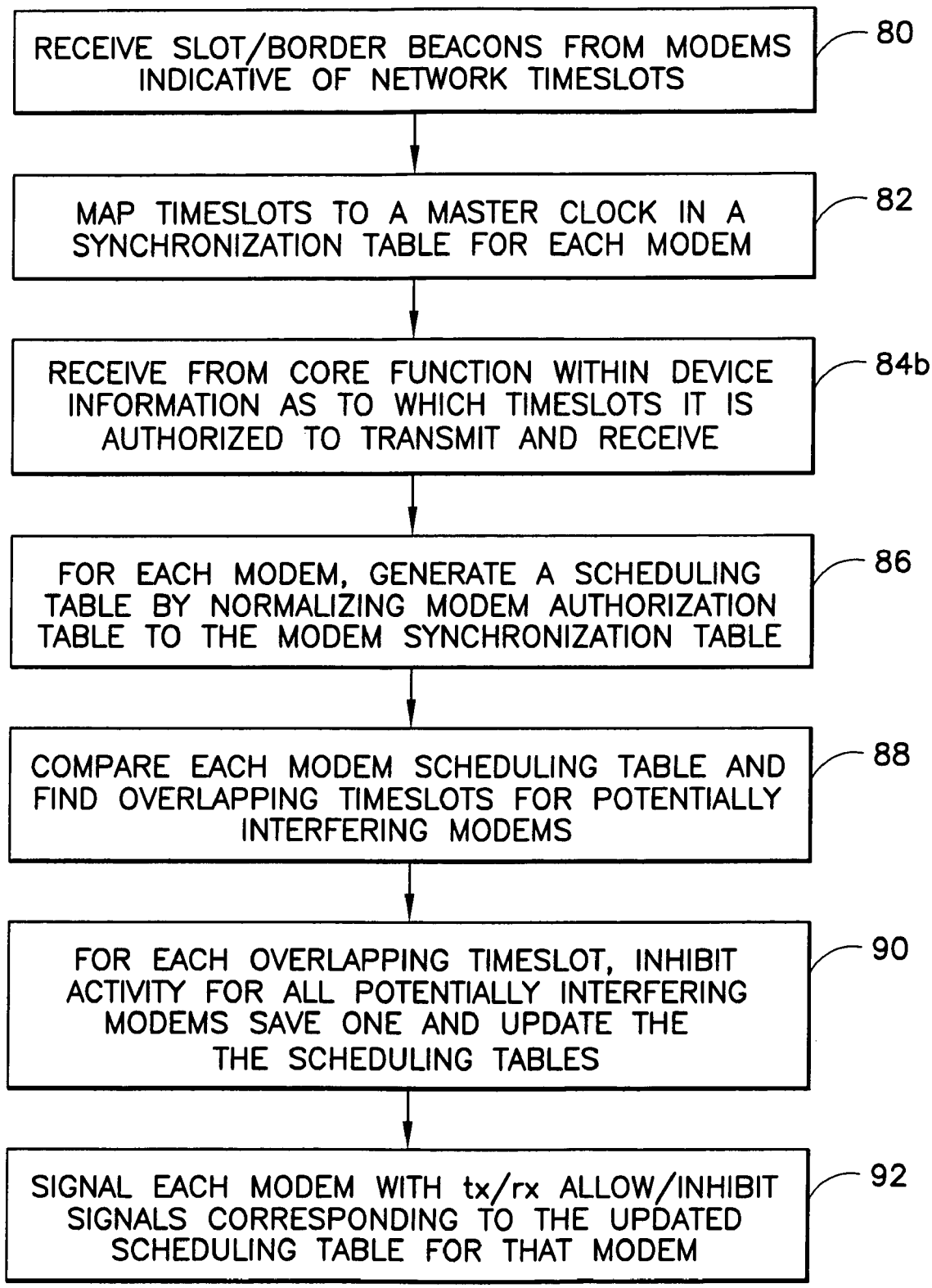
FIG. 6B illustrates process steps for synchronizing and scheduling modems of a multiradio device according to an exemplary embodiment of the invention for a network architecture consistent with the timing diagram of FIG. 3B.

FIG. 6A shows process steps according to a particular embodiment where a modem provides the MRC its traffic authorization information. FIG. 6B shows a similar set of process steps in a system where a modem's authorization pattern is known already in the MRC during modem connection setup. At block 80, the SSC 18 receives a slot border beacon from each of the modems, which indicate the timeslot boundaries for the network on which that modem is currently communicating. At block 82, the SSC maps the timeslot information received at block 80 to a master clock, such as the MRC clock seen in FIG. 3A to which the MCU 12 is synchronized, thereby generating the synchronization tables 42. At block 84a, the SSC 18 receives from each modem information concerning which timeslots the network has authorized the modem to transmit and to receive, generically those timeslots in which the subject modem is authorized to be active. Using the information of block 84a, at block 86 the SSC 18 generates for each modem a scheduling table of authorized activity, though this is not yet the described scheduling table. The SSC may load this non-final scheduling table into its internal buffer prior to sending an updated version to the memory 14. The scheduling tables from block 86 are normalized to the synchronization tables. The scheduling tables are compared at block 88 and overlapping timeslots for potentially interfering modems are found. The tables are normalized using the MRC tick domain as described as well as the scheduled overhead point, so this normalization may be done in part at least at block 82 where the tick domain is used rather than merely mapping to the MRC clock directly. At block 90, the scheduling tables from block 86 are updated to inhibit activity for all potentially interfering modems for each of the potentially interfering timeslots from block 88. This is preferably written to both the SSC 18 internal RAM 18a and the memory 14 that is directly accessible by the MCU 12. At block 92, the SSC 18 signals each modem with the transmit allow/inhibit signals and receive allow/inhibit signals seen in FIG. 1. Those signals are drawn directly from the tx/rx field pairs of the updated scheduling tables according to the embodiments detailed above.

In the transmission/reception allocation architecture which uses operation steps shown in FIG. 6A, the SSC monitors modem signals 24 and 26 for a duration determined by the MRC as indicated at step 84a, one measurement per positive beacon border edge. The SSC places the raw measured information in table 42 that is located in the common memory 14. The starting instant of the measurement is placed in the initial tick-field 44. The duration of the measurement is placed in the table size-field 46. Is cycling-field 48 is set to 'false'. For each slot border beacon 22, the value in the tx active 24 and rx active 26 signals are placed in table slots 50 and 52 respectively. At the first border beacon 22 after the measurement start the tx and rx activity values are placed in 50a and 52a, at second beacon in 50b and 52b and so on until as many beacons have been received as indicated by the table size-field 46. When the measurement period is over the MRC seeks a repeating pattern from the information in table 42. When the pattern is found, the table size-field is set to the size of the repeating pattern, the is cycling-field 48 is set to 'true' and the fields in table 42 starting from 50x, 52x, where x is greater than the value in table size-field are discarded. The SSC can now use the table 42 as a valid authorization table.

In the transmission/reception allocation architecture which uses operation steps shown in FIG. 6B, the monitoring routine described in the previous paragraph is not necessary. The authorization table is received from the element that configures MRC or alternatively from a database within MRC at step 84b.

During the step 86 MRC core functions map the authorization tables 42 for each modem connection to the modem's synchronization table 32. This method can be used, for example, for the Bluetooth protocol and shown in FIG. 3B. As an example case, Bluetooth data may be sent over an HV3 link, which is an SCO (synchronous connection oriented) type of link that partitions traffic into groups of slots (six slots shown in FIG. 3B). Slots 1, 3 and 5 are data transmission slots for the master device, and slots 2, 4 only one slave device. In HV3, slot 1 is used by the master device to send data to the slave device, slot 2 is used by the slave device to send data to the master device, and the remaining slots 3-6 are not used, unless/until other slave devices are added to this network. This pattern repeats every six slots. Whether master or slave, there is no signaling over the network for each authorized transmission or reception slot. What is transmitted is the network timing so that devices/modems on the network can synchronize their six-slot patterns, but each device knows its designated slot to transmit and receive once the Bluetooth connection is set up. The transmission allocation pattern that indicates which device transmits and receives in which slots is stored in a local memory.

Figure 3B:
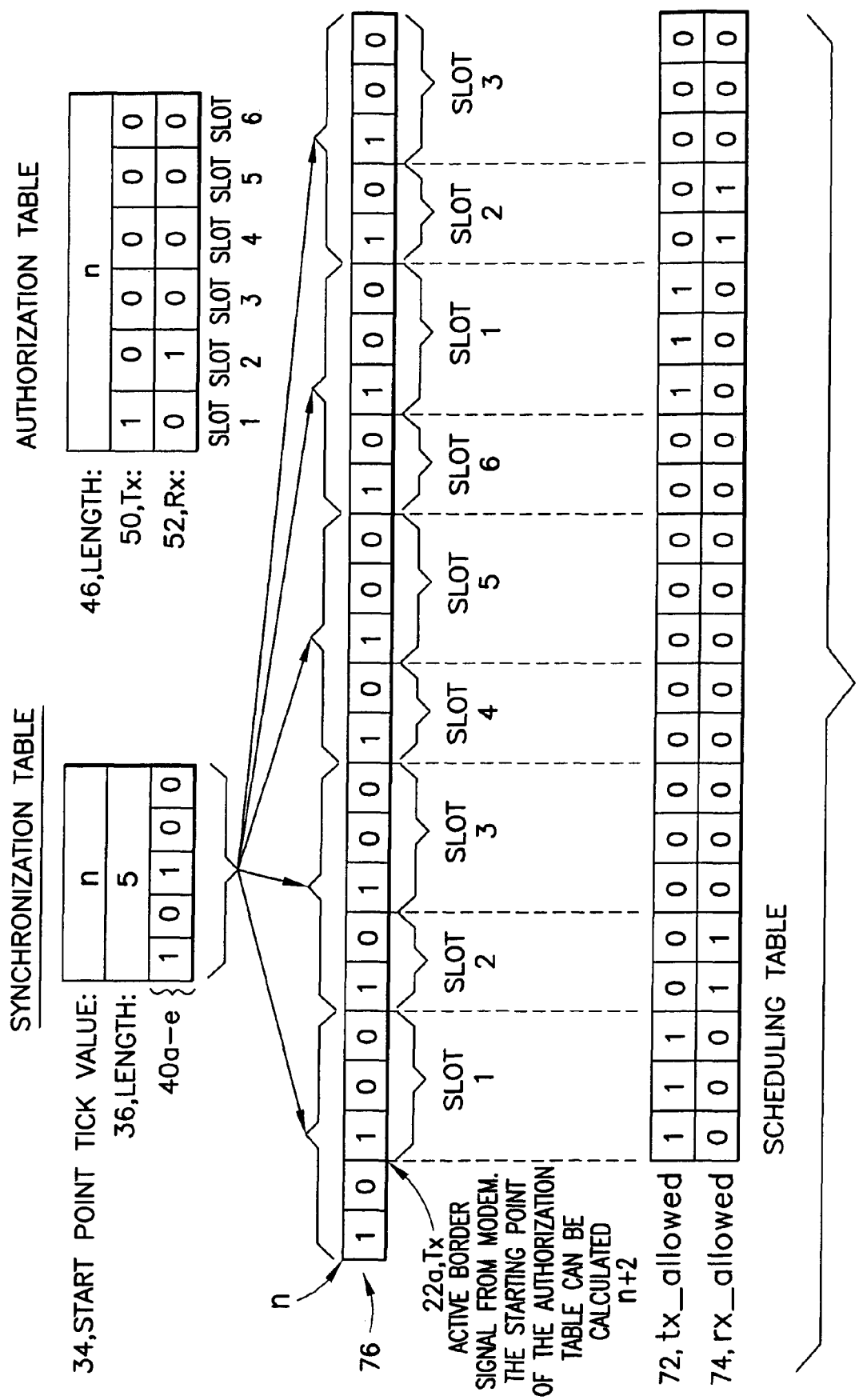
FIG. 3B is similar to FIG. 3A, but showing another exemplary embodiment of the invention for a different type of network architecture as compared to FIG. 3A.

FIG. 3B shows that authorization table for the master device using the master/slave example given above: transmit is allowed (bit=1) and reception is inhibited (bit=0) in slot 1 since that is when this master is allowed to transmit to the (single) slave, reception is allowed and transmission is inhibited in slot 2 since that is when the slave is authorized to transmit to this master, and slots 3-6 are not used and are therefore inhibited. The initial tick field 44 and cycling field 48 are not shown in this authorization table though they may be included in an embodiment. The resulting synchronization table is shown, with the cycling field 38 not shown (in this type of network allocation structure, the table would always cycle until replaced, such as when a new slave joins the network). There are five border elements 40a-e that cycle every tick, shown in the tick diagram 76 as repeating.

Assume the connection is setup at tick=n and slot 1 begins at tick=n+2, shown as a transmission active signal 22a for the master device/modem. The border elements 40a-e repeat each five ticks. The bit sequences for transmission 72 and reception 74 are shown aligned with the tick diagram 76. In slot 1 for this master device, transmission is allowed (bit=1) and reception is inhibited (bit=0) for the three ticks that span slot 1, following the first tx/rx pair of the authorization table that correspond to slot 1. Slot 2 spans two ticks, and the second pair of tx/rx bits from the authorization table are repeated in the sequences 72, 74 across those two ticks so as to span all of slot 2. Slots 3-6 are all inhibited for transmission and reception, consistent with the tx/rx pairs corresponding to those slots in the authorization table. The transmission 72 and reception 74 bit sequences then repeat at the next tick in the tick diagram 76, which corresponds to the next instance of slot 1 in that network.

As stated earlier, a similar procedure 86 is repeated for each modem connection. When the step 86 is completed, SSC has a scheduling table (such as in the bottom of FIG. 3B) for each modem. These scheduling tables may vary in their sizes, starting values and patterns. However, they now all share a common time reference (MRC tick) and thus may be compared with each other as shown in FIG. 5.

Because embodiments of this invention resolve and prevent interference among modems operating on disparate networks, the different aspects of FIGS. 6A and 6B can be readily combined into one embodiment, where one modem operates in a first network allocating on a per-transmission basis (FIG. 3A) and another modem operates in a second network allocating according to a repeating schedule that is authorized upon connection setup (FIG. 3B).

Following are some implementation details that may be present in various embodiments. The connection between the SSC 18 and the memory 14 may be via the illustrated bus 16 or it may be direct. Latencies can be non-deterministic, only a maximum delay need be known as in the above detailed embodiments. The connection with the modems needs to be such, that all signals to and from SSC have a known delay, which is accounted for in the signals 28, 30 sent to the specific modem 20*a*, 20*b*, 20*c*.

The SSC 18 may be considered to functionally maintain the master clock tick domain, which in FIG. 3A is an MRC tick 54. As above, the tick is a time unit (in the MRC 12) to which all the modems' behavior is mapped for purposes of synchronizing under embodiments of this invention. As above, the synchronization table's traffic element border fields 40*a*-40*x* represent the modem's status during a single tick. The SSC 18 generates the synchronization table 32 by monitoring the signals 22, 24, 26 that it receives from the modems 20*a*, 20*b*, 20*c*. The synchronization table 32 is written to the common memory 14, from where MRC 12 core functions may read it.

The SSC 18 also schedules each modem with the tx allow/inhibit signals 28 and rx allow/inhibit signals 30, which are drawn from the scheduling table 42 for that modem. The scheduling table 42 may be generated by the MRC core functions and written to the common memory 14. The SSC may reads the table—or a piece of it—to its internal buffer 18*a*. An internal buffer 18*a* is advantageous, because the information needed to schedule the modems needs to be available immediately during the scheduling operation. The buffer control 18*b* inside the SSC 18 maintains valid scheduling information in the buffer 18*a* while the schedule routine (in hardware, software, or a combination) signals each modem their current schedule statuses, the signals 28, 30. The statuses are acquired by looking in the scheduling tables 42 at the index, where current time (or current tick, see FIG. 5) equals the table's initial tick (field 44), plus the traffic element border field index (the current one of the tx/rx pairs 50*a*/52*a* to 50*y*/52*y*), plus the modem's schedule overhead value. The schedule overhead value is modem-specific and is used to compensate any known latencies caused in the system by the relative interconnections of the SSC 18 to the modems 20*a*, 20*b*, 20*c*. Since these latencies are relatively fixed once the device 10 is assembled, it need be computed only once for each different type of device 10 into which an otherwise generic SSC 18 ASIC/ASIP is installed, so bus arbitration is easily addressed for different type multiradio devices 10.

In one aspect, the foregoing description concerns how to prevent collisions among modems of a multi-modem terminal seeking concurrent access to a common communications channel when each of the modems of the multi-modem terminal may be operating with reference to a different internal or external clock. The methods and apparatus of this aspect of the invention relate the requirements of the respective modems for a common communications resource to a common time reference so that conflicts (such as, for example, where two or more of the modems are seeking access to a common communications channel) can be identified. Once conflicting requirements are identified, then this aspect of the invention describes methods for handling conflicts by allowing one modem access to the communications resource while inhibiting another modem from accessing the resource.

Identifying and being able handle conflicts represents one aspect of a more general scheduling problem. Related U.S. patent application Ser. No. 11/647,620 concerns scheduling of access to a common communications resource or channel. Methods and apparatus described in related U.S. patent application Ser. No. 11/647,615 allocate access among modems of a multi-modem terminal using priorities and properties assigned to each of the modems. Certain methods operate by assigning the highest priority modem sole access to the communications resource when it is determined that there is a conflict between the highest priority modem and lower priority modems. Other methods operate by evaluating properties assigned to the modems to determine compatibility among the modems. In certain instances, concurrent use of the common resource by two or more modems of the multi-modem terminal may be possible. In such a situation, allocation of the common resource should reflect this fact. Methods and apparatus of U.S. patent application Ser. No. 11/647,620 provide for the creation of schedules to regulate access to a common communications resource by modems of a multi-modem terminal.

In certain instances, though, it may be desirable to deviate for a temporary period from a pre-determined schedule, or from an as-needed allocation procedure that always allocates access to a communications resource to the highest priority modem. For instance, a modem that is ordinarily accorded a relatively low priority in comparison to other modems of the multi-modem terminal may be seeking at a particular instant, or over a period of time, to communicate critical information. In such situations, it may be desirable to grant the ordinarily low priority modem greater access to a common communications resource or channel. The following aspects of the invention, which may be practiced alone or in combination with the foregoing aspects, provide methods and apparatus to accomplish this.

In accordance with exemplary and non-limiting embodiments of the invention, methods are described to temporarily reduce the air time of higher priority modem connections to the benefit of lower priority connections in a quick and controlled fashion. FIG. 7 is a flowchart depicting one such method. At step 110, the Multiradio Controller (MRC) assigns a priority to each modem of a multi-modem terminal. Then, at step 120, the MRC allocates access to a common communications channel used by the modems of the multi-modem terminal in accordance with an initial allocation pattern, wherein the initial allocation pattern allocates access to the common communications resource by modem priority. Typically, sole access is granted to the communications channel at particular instants in time to the highest priority modem seeking access to the common communications channel. Next, at step 130, the MRC decides during a temporary period to reallocate access to the common communications channel. Then, at step 140, during the temporary period the MRC reallocates at least a portion of access ordinarily allocated to a higher priority modem to a lower priority modem.

Although FIG. 7 makes reference to "modem", the same reallocation method can be used with respect to radios; separate data streams, etc. For example, it is conceivable that a distinct data stream may be carried by different modems at different times. In such instances, it would be preferable to assign individual priorities to the data streams, rather than to modems used to transmit or receive the data streams. Alternatively, when the separate modems are used to communicate or receive the same types of information at all times, and wherein the information carried by the different modems have mostly constant relative priorities, it may be easier to speak of the modem being assigned a priority.

Figure 8:
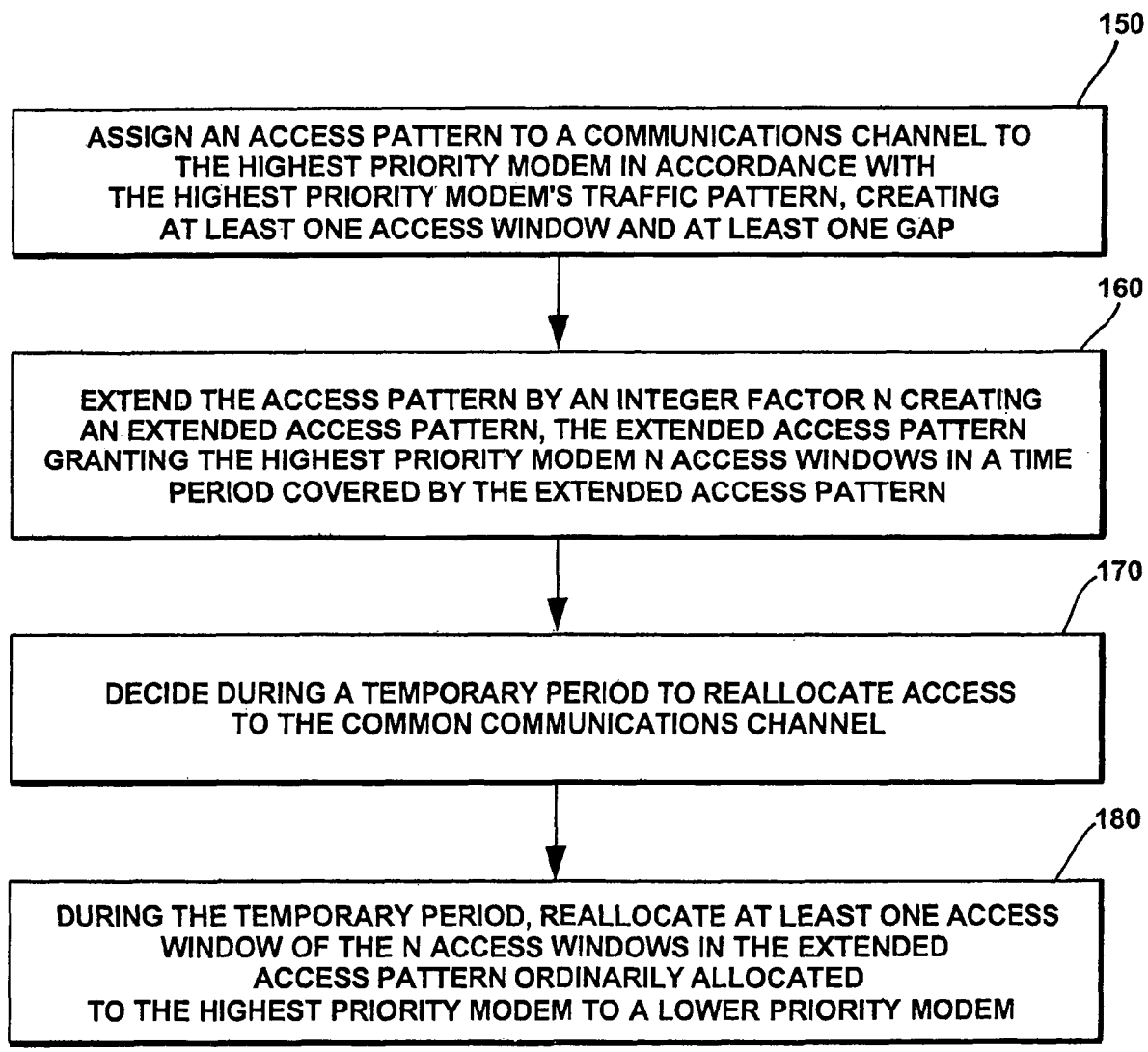
FIG. 8 is a flowchart depicting a method operating in accordance with an embodiment of the invention.
Figure 9:
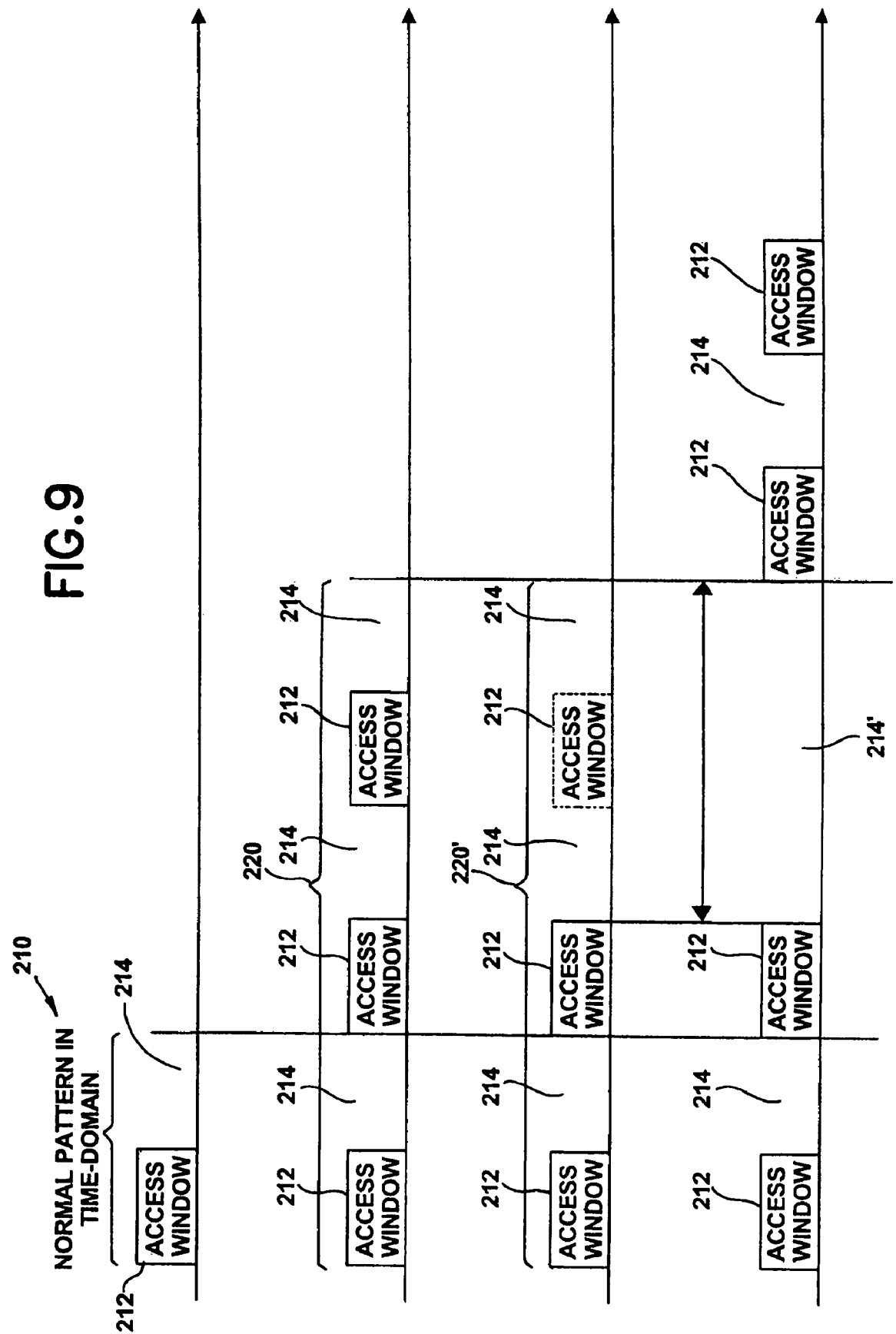
FIG. 9 is a chart graphically depicting the operation of the method depicted in FIG. 8.

FIG. 7 depicts a general method of reallocating access on a temporary basis. FIGS. 8-9 depicts more specifically operations of a method otherwise generally operating in accordance with FIG. 7. At step 150, an access pattern 210 regulating access to a communications channel is assigned to the highest priority modem in accordance with the highest priority modem's traffic pattern, creating at least one access window 212 and at least one gap 214. During the access window 212, the highest priority modem has sole access to the common communications channel, and during gap 214, the lower priority modems have access to the common communications channel. The result of step 150 is shown in the first row of FIG. 9. At step 160, the access pattern 210 granted to the highest priority modem is extended by an integer factor N (in the example depicted in FIG. 9, N=3) creating an extended access pattern 220. During the time period covered by the extended access pattern 220, the highest priority modem has 3 access windows 212 during which it has sole access to the common communications channel. Likewise, during the time period covered by extended access pattern 220, there are 3 gaps where the common communications channel is available to lower priority modems. This extended access pattern repeats after the expiration of a time period equal to the time period covered by the extended access pattern 220. The result of step 160 is depicted in the second row of FIG. 9. Then, at step 170, it is decided during a temporary period to reallocate access to the common communications channel. This is accomplished at step 180 by reallocating at least one access window of the N access windows in the extended access pattern 220 ordinarily allocated to the highest priority modem to a lower priority modem. During the temporary period, a modified extended access pattern 220' is created as shown by the last two rows of FIG. 9. A larger gap 214' is created for at least a portion of the time period covered by the modified extended access pattern 220', thereby increasing the availability of the common communications channel to the lower priority modem during the temporary period.

Figure 10:
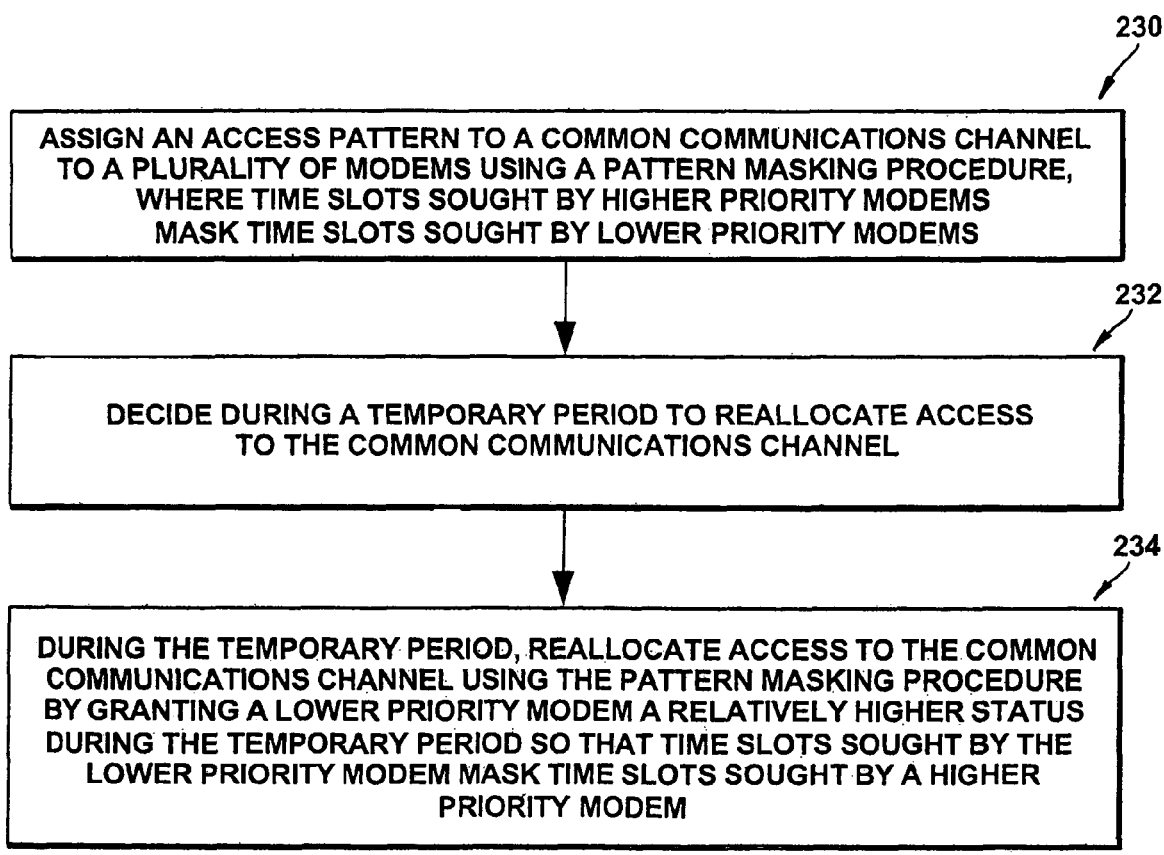
FIG. 10 is a flowchart depicting a method operating in accordance with an embodiment of the invention.
Figure 11:
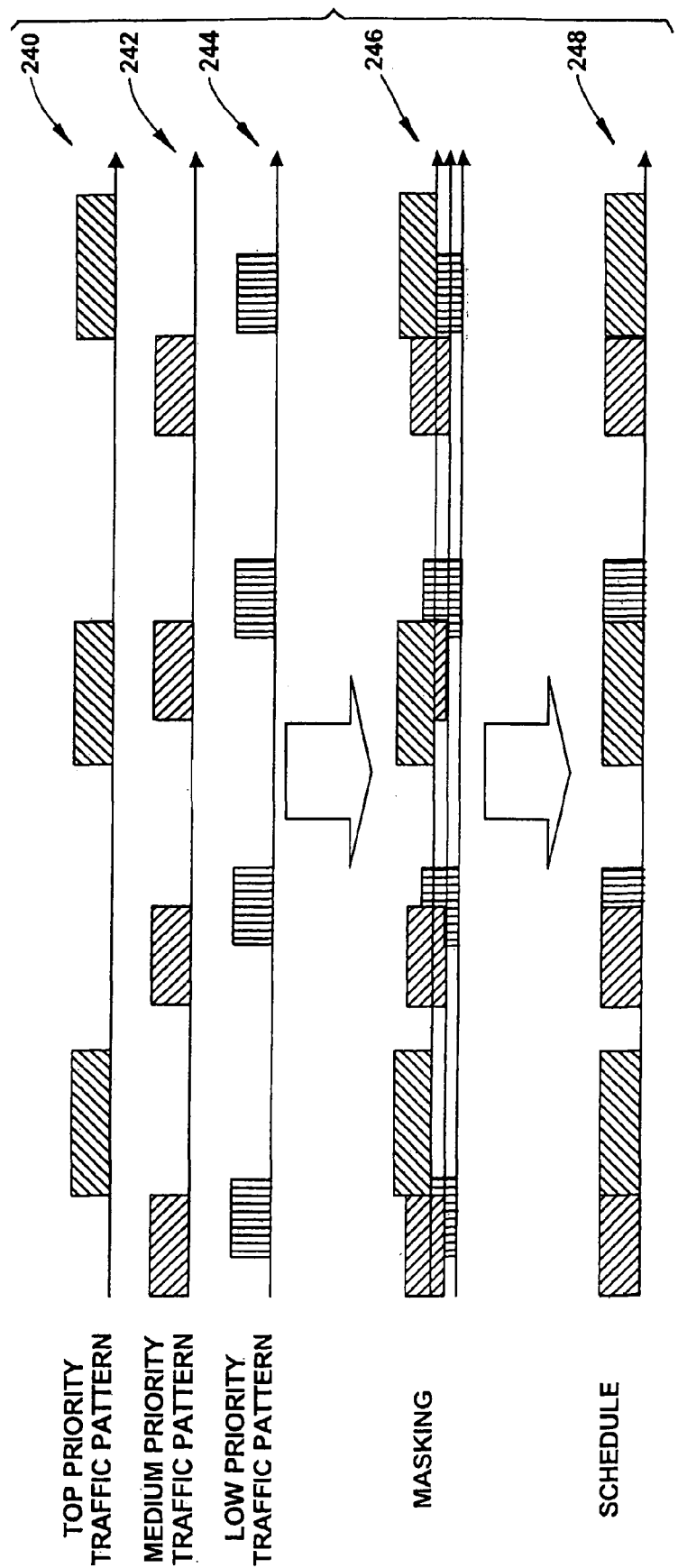

FIGS. 10-12 depict an alternate method for reallocating access to a common communications channel during a temporary period. At step 230 shown in FIG. 10, an access pattern or schedule allocating access to a common communications channel to a plurality of modems of a multi-modem terminal is created using a pattern masking procedure. The pattern masking procedure operates as depicted in FIG. 11. The MRC receives requests from a modem carrying a top priority traffic pattern 240; a modem carrying a medium priority traffic pattern 242; and a modem carrying a low priority traffic pattern 244. The requests comprise a specification of time slots (shown by the hatched rectangles) where the modems require sole access to the common communications channel. The operation of the pattern masking procedure is depicted by 246. When there is no conflict among the modems for access time, the modems are accorded the time slots they seek. When there is a conflict, time slots sought by relatively higher priority modems mask time slots sought by relatively lower priority modems when creating a access pattern or schedule. The result of the pattern masking procedure is shown by schedule 248. The operation shown in FIG. 11 represents the creation of a nominal schedule that regulates normal access to the common communications channel.

At step 232 of the method depicted in FIG. 10, it is decided during a temporary period to reallocate access to the common communications channel. This is accomplished at step 234, when access during the temporary period is reallocated using the pattern masking procedure by granting a lower priority modem a relatively higher status during the temporary period so that time slots sought by the lower priority modem mask time slots sought by at least one modem that is ordinarily accorded a higher priority than the lower priority modem. The flipping of priority is shown in FIG. 12. As can be seen, top priority traffic pattern 240 still takes precedence. But during the temporary period ordinarily low priority traffic pattern 242 is granted a higher priority than medium priority traffic pattern 244. When there is a conflict during performance of the pattern masking procedure 246' the time slots of the low priority traffic pattern 244 mask the time slots of the medium priority traffic pattern 244, thus according access to the low priority modem whenever there is not another traffic pattern with a higher priority than the medium priority traffic pattern also seeking access to the common communications channel. A revised access schedule 248' is thus created.

When implementing the priority order modification of FIGS. 10-12, various schemes can be employed to define the manner in which the priority of traffic patterns can be altered or boosted. A modem connection is configured in MRC with its priority information. In an exemplary embodiment, this priority can be qualified in the following manner:

Odd priority level (1, 3, 5 . . . )—modification of link quality is not allowed.
Even priority level (2, 4, 6 . . . )—modification of link quality is allowed.

As defined herein, when the priority of a connection or traffic pattern is higher, the smaller its value. As a result, if there are two connections with priorities of 1 and 3, no modification will take place. If, however, there are two connections with priorities of 2 and 3, then the higher priority modem's access can be temporarily modified.

Such modification is required when a modem informs the MRC of a change in its data priority. This can happen when a packet retransmission is taking place. When a priority change is reported, the MRC checks if the higher priority connections/modems can be modified. If modification is possible, a change in the connection's access window 11 is made for a period of time. After the period has expired, access windows 11 are returned to their former state. The overall requirement for the temporary increase in the air time for the connection with changed priority is predetermined in the connection properties. These properties are configured in the MRC during connection setup.

In addition to changing priority orders, the MRC is capable of monitoring the granted accesses of different radio modems. If there is continuously a connection having the low priority and the monitoring indicates that the radio is not capable of serving the related application, the MRC can either increase the priority temporarily or inform upper layers to reroute the current application to another radio bearer.

In accordance with the preceding exemplary embodiments, priority reordering does not require special interpretation of priority values. The smaller the priority value, the more air time a connection receives.

In general, the various embodiments of the device 10 can include, but are not limited to, cellular phones, cellular communicators, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Embodiments of this invention may be implemented in part or in whole by computer software executable by a data processor such as the SSC 18 or the MCU 12 of the device 10, or by hardware, or by a combination of software and hardware. Such software may be embodied on a computer readable medium such as the memory 14 or an internal memory of the SSC (in addition to the buffer 18a), and when executed by an associated data processor enable the multiradio device 10 to operate in accordance with the exemplary embodiments of this invention.

The memory 14, 18a may be of any type suitable to the local technical environment and may be implemented using any suitable data storage technology, such as semiconductor-based memory devices, magnetic memory devices and systems, optical memory devices and systems, fixed memory and removable memory. The processor MCU 12 and/or SSC 18 may be of any type suitable to the local technical environment, and may include one or more of general purpose computers, special purpose computers, microprocessors, digital signal processors (DSPs) and processors based on a multi-core processor architecture, as non-limiting examples.

Based on the foregoing it should be apparent that the exemplary embodiments of this invention provide a method, apparatus and computer program product to map a first set of timeslots for a first modem of a device to a master clock, to map a second set of timeslots for a second modem of a device to the master clock, and to inhibit at least one of transmission and reception of the first modem during a timeslot of the first set that overlaps with a timeslot of the second set.

In general, the various embodiments may be implemented in hardware or special purpose circuits, software, logic or any combination thereof. For example, some aspects may be implemented in hardware, while other aspects may be implemented in firmware or software that may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:

assigning a priority to each modem of a multi-modem terminal;

allocating access to a common communications channel used by the modems of the multi-modem terminal in accordance with an allocation pattern, wherein the allocation pattern allocates access by each modem during a time period to the common communications channel by modem priority;

except during a temporary period, causing the modems to access the common communications channel according to the allocation pattern for a plurality of time periods;

during the temporary period, performing the following:
  deciding to reallocate access to the common communications channel;
  reallocating, to create a temporary allocation pattern, at least a portion of access ordinarily allocated by the allocation pattern to a higher priority modem to a lower priority modem; and
  causing the modems to access the common communications channel according to the temporary allocation pattern for however many time periods are involved in the temporary period.

2. The method of claim 1 wherein:

allocating access to a common communications channel further comprises assigning an access pattern to a highest priority modem in accordance with the highest priority modem's traffic pattern, creating at least one access window for use by the highest priority modem and at least one gap wherein the common communications channel is available to lower priority modems; and causing the modems to access the common communications channel further comprises extending the access pattern by an integer factor N creating an extended access pattern, the extended access pattern granting the highest priority modem at least N access windows in a time period covered by the extended access pattern, and creating at least N gaps where the common communications channel is available to lower priority modems and causing the modems to access the common communications channel according to the extended access pattern.

3. The method of claim 2, wherein reallocating at least a portion of access ordinarily allocated to a higher priority modem further comprises;

reallocating at least one access window of the N access windows in the extended access pattern ordinarily allocated to the highest priority modem to a lower priority modem.

4. The method of claim 1 wherein:

allocating access further comprises allocating an access pattern to the common communications channel to the plurality of modems using a pattern masking procedure, where for scheduling purposes a time slot sought by a higher priority modem that conflicts with a time slot sought by a lower priority modem masks the time slot of the lower priority modem to the extent that there is a conflict, thereby according access to the higher priority modem during the conflicting portion of the time slots and preventing access to the lower priority modem during the conflicting portion of the time slots; and causing the modems to access the common communications channel further comprises causing the modems to access the common communications channel according to the access pattern.

5. The method of claim 4 wherein reallocating at least a portion of access ordinarily allocated to a higher priority modem to a lower priority modem further comprises:

reallocating access to the common communications channel using the pattern masking procedure by granting a lower priority modem a relatively higher status so that a time slot sought by the lower priority modem masks a time slot sought by at least one modem ordinarily having a higher priority to the extent that there is a conflict between time slots sought by the modems.

6. The method of claim 5 further comprising:

establishing information for each modem of the multi-modem terminal indicating whether status of the particular modem can be altered during the temporary period.

7. The method of claim 6 further comprising:

during the temporary period before reallocating access to the common communications channel, checking the information established for each modem indicating whether the status of the modem can be changed before altering the status of the modem.

8. An apparatus comprising:

a plurality of modems, the plurality of modems configured to transmit and receive signals in a common communications channel; and a multiradio controller coupled to each of the plurality of modems, the multiradio controller configured to assign a priority to each modem; to allocate access to a common communications channel used by the modems in accordance with an allocation pattern, wherein the allocation pattern allocates access by each modem during a time period to the common communications channel by modem priority; to cause, except during a temporary period, the modems to access the common communications channel according to the allocation pattern for a plurality of time periods; and during the temporary period to perform the following: to decide to reallocate access to the common communications channel; to reallocate, to create a temporary allocation pattern, at least a portion of access ordinarily allocated by the allocation pattern to a higher priority modem to a lower priority modem; and to cause the modems to access the common communications channel according to the temporary allocation pattern for however many time periods are involved in the temporary period.

9. The apparatus of claim 8 wherein to allocate access to a common communications channel further comprises; assigning an access pattern to a highest priority modem in accordance with the highest priority modem's traffic pattern, creating at least one access window for use by the highest priority modem and at least one gap wherein the common communications channel is available to lower priority modems; and wherein to cause the modems to access the common communications channel further comprises extending the access pattern by an integer factor N creating an extended access pattern, the extended access pattern granting the highest priority modem at least N access windows in a time period covered by the extended access pattern, and creating at least N gaps where the common communications channel is available to lower priority modems and causing the modems to access the common communications channel according to the extended access pattern.

10. The apparatus of claim 9, wherein to reallocate at least a portion of access ordinarily allocated to a higher priority modem further comprises reallocating at least one access window of the N access windows in the extended access pattern ordinarily allocated to the highest priority modem to a lower priority modem.

11. The apparatus of claim 8 wherein to allocate access to a common communications channel used by the modems in accordance with an allocation pattern further comprises allocating an access pattern to the common communications channel to the plurality of modems using a pattern masking procedure, where for scheduling purposes a time slot sought by a higher priority modem that conflicts with a time slot sought by a lower priority modem masks the time slot of the lower priority modem to the extent that there is a conflict, thereby according access to the higher priority modem during the conflicting portion of the time slots and preventing access to the lower priority modem during the conflicting portion of the time slots and wherein to cause the modems to access the common communications channel further comprises causing the modems to access the common communications channel according to the access pattern.

12. The apparatus of claim 11 wherein to reallocate at least a portion of access ordinarily allocated to a higher priority modem to a lower priority modem further comprises reallocating access to the common communications channel using the pattern masking procedure by granting a lower priority modem a relatively higher status so that a time slot sought by the lower priority modem masks a time slot sought by at least one modem ordinarily having a higher priority to the extent that there is a conflict between time slots sought by the modems.

13. The apparatus of claim 12 wherein modem access control unit is further configured to establish information for each modem of the multi-modem terminal indicating whether status of the particular modem, can be altered during the temporary period.

14. The apparatus of claim 13 wherein the modem access control unit during the temporary period before reallocating access to the common communications channel, is further configured to check the information established for each modem indicating whether the status of the modem can be changed before altering the status of the modem.

15. A computer program product comprising a non-transitory computer readable memory medium tangibly embodying a computer readable program, the computer readable program executable by data processing apparatus, the computer readable program, when executed, configured to assign a priority to each modem of a multi-modem terminal; to allocate access to a common communications channel used by the modems of the multi-modem terminal in accordance with an allocation pattern, wherein the allocation pattern allocates access by each modem during a time period to the common communications channel by modem priority; to cause, except during a temporary period, the modems to access the common communications channel according to the allocation pattern for a plurality of time periods, and during the temporary period, to perform the following: to decide to reallocate access to the common communications channel; to reallocate, to create a temporary allocation pattern, at least a portion of access ordinarily allocated by the allocation pattern to a higher priority modem to a lower priority modem; and to cause the modems to access the common communications channel according to the temporary allocation pattern for however many time periods are involved in the temporary period.

16. The computer program product of claim 15 wherein to allocate access to a common communications channel further comprises assigning an access pattern to a highest priority modem in accordance with the highest priority modem's traffic pattern, creating at least one access window for use by the highest priority modem and at least one gap wherein the common communications channel is available to lower priority modems; and wherein to cause the modems to access the common communications channel further comprises extending the access pattern by an integer factor N creating an extended access pattern, the extended access pattern granting the highest priority modem at least N access windows in a time period covered by the extended access pattern, and creating at least N gaps where the common communications channel is available to lower priority modems and causing the modems to access the common communications channel according to the extended access pattern.

17. The computer program product of claim 16, wherein to reallocate at least a portion of access ordinarily allocated to a higher priority modem further comprises reallocating at least one access window of the N access windows in the extended access pattern ordinarily allocated to the highest priority modem to a lower priority modem.

18. The computer program product of claim 15 wherein to allocate access to a common communications channel used by the modems of the multi-modem terminal in accordance with an allocation pattern further comprises allocating an access pattern to the common communications channel to the plurality of modems using a pattern masking procedure, where for scheduling purposes a time slot sought by a higher priority modem that conflicts with a time slot sought by a lower priority modem masks the time slot of the lower priority modem to the extent that there is a conflict, thereby according access to the higher priority modem during the conflicting portion of the time slots and preventing access to the lower priority modem during the conflicting portion of the time slots and wherein to cause the modems to access the common communications channel further comprises causing the modems to access the common communications channel according to the access pattern.

19. The computer program product of claim 18 wherein to reallocate at least a portion of access ordinarily allocated to a higher priority modem to a lower priority modem further comprises: reallocating access to the common communications channel using the pattern masking procedure by granting a lower priority modem a relatively higher status so that a time slot sought by the lower priority modem masks a time slot sought by at least one modem ordinarily having a higher priority to the extent that there is a conflict between time slots sought by the modems.

20. The computer program product of claim 19 wherein the computer readable program is further configured to establish information for each modem of the multi-modem terminal indicating whether status of the particular modem can be altered during the temporary period.

21. The computer program product of claim 20 wherein the computer readable program is further configured during the temporary period before reallocating access to the common communications channel, to check the information established for each modem indicating whether the status of the modem can be changed before altering the status of the modem.

* * * * *

UNITED STATES PATENT AND TRADEMARK OFFICE
CERTIFICATE OF CORRECTION

| | |
|---|---|
| PATENT NO. | : 7,889,756 B2 |
| APPLICATION NO. | : 11/648100 |
| DATED | : February 15, 2011 |
| INVENTOR(S) | : Pernu |

It is certified that error appears in the above-identified patent and that said Letters Patent is hereby corrected as shown below:

Claim 2, col. 16, line 33 delete "avail able" and insert --available--.

Signed and Sealed this
Twelfth Day of April, 2011

David J. Kappos
*Director of the United States Patent and Trademark Office*